United States Patent
Kimes et al.

(10) Patent No.: US 11,215,245 B2
(45) Date of Patent: Jan. 4, 2022

(54) COUPLING AND CONTROL ASSEMBLY INCLUDING CONTROLLABLE COUPLING ASSEMBLY HAVING SPEED SENSOR AND METHODS OF CONTROLLING THE CONTROLLABLE COUPLING ASSEMBLY USING INFORMATION FROM THE SPEED SENSOR FOR PARK/HILL-HOLD OPERATIONS

(71) Applicant: Means Industries, Inc., Saginaw, MI (US)

(72) Inventors: John W. Kimes, Wayne, MI (US); Philip B. Woodley, Chicago, IL (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 16/701,633

(22) Filed: Dec. 3, 2019

(65) Prior Publication Data
US 2021/0164526 A1 Jun. 3, 2021

(51) Int. Cl.
| | |
|---|---|
| *F16D 41/16* | (2006.01) |
| *F16D 48/06* | (2006.01) |
| *F16D 28/00* | (2006.01) |
| *F16D 41/04* | (2006.01) |

(52) U.S. Cl.
CPC ............ *F16D 48/06* (2013.01); *F16D 28/00* (2013.01); *F16D 41/04* (2013.01); *F16D 41/16* (2013.01); *F16D 2500/1021* (2013.01)

(58) Field of Classification Search
CPC .......... F16D 48/06; F16D 28/00; F16D 41/04; F16D 41/16; F16D 2500/1021; F16D 41/084; F16D 43/284; F16D 45/00; F16D 41/07; F16D 41/30
See application file for complete search history.

(56) References Cited

U.S. PATENT DOCUMENTS

| | | |
|---|---|---|
| 4,050,560 A | 9/1977 | Torstenfelt |
| 4,340,133 A | 7/1982 | Blersch |
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,342,258 A | 8/1994 | Egyed |
| 5,362,093 A | 11/1994 | Romanauskas |

(Continued)

*Primary Examiner* — David J Hlavka
(74) *Attorney, Agent, or Firm* — Brooks Kushman P.C.

(57) ABSTRACT

A coupling assembly has a second coupling member mounted for rotation and a first coupling member having a speed sensor to sense a speed of rotation of the second coupling member. The coupling assembly further has a forward and a reverse locking element movable between (i) a coupling position in which the locking elements engage the second coupling member to thereby prevent rotation of the second coupling member in opposite first and second directions and (ii) a non-coupling position. Upon the speed of rotation of the second coupling member decreasing to be lower than a hill-hold speed threshold, the reverse locking element is moved to the coupling position while the forward locking element is maintained in the non-coupling position. Irrespective of a Park command, the locking elements are maintained in the non-coupling position while the speed of rotation of the second coupling member is greater than a park speed threshold.

20 Claims, 5 Drawing Sheets

(56) References Cited

U.S. PATENT DOCUMENTS

| | | |
|---|---|---|
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,846,257 A | 12/1998 | Hood |
| 5,918,715 A | 7/1999 | Ruth et al. |
| 5,924,510 A | 7/1999 | Itoh et al. |
| 5,927,455 A | 7/1999 | Baker et al. |
| 6,065,576 A | 5/2000 | Shaw et al. |
| 6,075,302 A | 6/2000 | McCleer |
| 6,193,038 B1 | 2/2001 | Scott et al. |
| 6,244,965 B1 | 6/2001 | Klecker et al. |
| 6,290,044 B1 | 9/2001 | Burgman et al. |
| 6,328,670 B1 | 12/2001 | Minowa et al. |
| 6,503,167 B1 | 1/2003 | Sturm |
| 6,692,405 B2 | 2/2004 | Minowa |
| 6,814,201 B2 | 11/2004 | Thomas |
| 6,846,257 B2 | 1/2005 | Baker et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,223,198 B2 | 5/2007 | Kimes et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryan et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,690,455 B2 | 4/2010 | Kano et al. |
| 7,695,387 B2 | 4/2010 | Oba et al. |
| 7,806,795 B2 | 10/2010 | Oba et al. |
| 7,942,781 B2 | 5/2011 | Kimes |
| 8,286,722 B2 | 10/2012 | Leimbach et al. |
| 8,720,659 B2 | 5/2014 | Pawley |
| 8,813,929 B2 | 8/2014 | Kimes |
| 8,888,637 B2 | 11/2014 | Kimes |
| 9,109,636 B2 | 8/2015 | Kimes et al. |
| 9,121,454 B2 | 9/2015 | Pawley |
| 9,186,977 B2 | 11/2015 | Kimes |
| 9,188,170 B2 | 11/2015 | Prout et al. |
| 9,255,614 B2 | 2/2016 | Kimes |
| 9,303,699 B2 | 4/2016 | Kimes et al. |
| 9,371,868 B2 | 6/2016 | Kimes et al. |
| 9,435,387 B2 | 9/2016 | Kimes et al. |
| 9,441,708 B2 | 9/2016 | Kimes et al. |
| 9,482,294 B2 | 11/2016 | Kimes |
| 9,482,297 B2 | 11/2016 | Brubaker et al. |
| 9,541,141 B2 | 1/2017 | Kimes et al. |
| 9,562,574 B2 | 2/2017 | Kimes |
| 9,638,266 B2 | 5/2017 | Kimes |
| 9,732,809 B2 | 8/2017 | Niemiec et al. |
| 9,874,252 B2 | 1/2018 | Kimes et al. |
| 2003/0102196 A1 | 6/2003 | Wetzel et al. |
| 2004/0110594 A1 | 6/2004 | Goto |
| 2006/0138777 A1 | 6/2006 | Hofbauer et al. |
| 2006/0185957 A1 | 8/2006 | Sedlacek et al. |
| 2006/0252589 A1 | 11/2006 | Tay |
| 2006/0278487 A1 | 12/2006 | Pawley et al. |
| 2007/0056825 A1 | 3/2007 | Fetting et al. |
| 2007/0278061 A1 | 12/2007 | Wittkopp et al. |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0084653 A1 | 4/2009 | Holmes |
| 2009/0098968 A1 | 4/2009 | Maguire et al. |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0044141 A1 | 2/2010 | Kimes et al. |
| 2010/0071497 A1 | 3/2010 | Reisch et al. |
| 2010/0119389 A1 | 5/2010 | Lazebnik et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0140451 A1 | 6/2011 | Sharples et al. |
| 2011/0177900 A1 | 7/2011 | Simon |
| 2011/0215575 A1 | 9/2011 | Hofbauer et al. |
| 2011/0233026 A1 | 9/2011 | Pawley |
| 2012/0149518 A1 | 6/2012 | Kimes |
| 2013/0256078 A1 | 10/2013 | Kimes et al. |
| 2013/0277164 A1 | 10/2013 | Prout et al. |
| 2014/0080648 A1 | 3/2014 | Kimes |
| 2014/0100071 A1 | 4/2014 | Kimes |
| 2015/0000442 A1 | 1/2015 | Kimes et al. |
| 2015/0001023 A1 | 1/2015 | Kimes |
| 2015/0014116 A1 | 1/2015 | Kimes et al. |
| 2016/0047439 A1 | 2/2016 | Kimes et al. |
| 2016/0131205 A1 | 5/2016 | Essenmacher |
| 2016/0131206 A1 | 5/2016 | Essenmacher |
| 2016/0265609 A1* | 9/2016 | Corsetti ................ F16D 41/30 |
| 2016/0369855 A1 | 12/2016 | Essenmacher |
| 2016/0377126 A1 | 12/2016 | Essenmacher |
| 2017/0240038 A1* | 8/2017 | Spangler ................ B60K 6/48 |
| 2017/0254370 A1* | 9/2017 | Peglowski .............. F16D 23/12 |
| 2017/0254375 A1* | 9/2017 | Campton ................ F16D 23/12 |
| 2017/0254376 A1* | 9/2017 | Campton ................ F16D 25/14 |
| 2018/0010651 A1 | 1/2018 | Kimes |
| 2018/0038425 A1 | 2/2018 | Kimes |
| 2018/0106304 A1 | 4/2018 | Kimes et al. |
| 2018/0156332 A1 | 6/2018 | Kimes et al. |
| 2018/0231105 A1 | 8/2018 | Kimes et al. |
| 2018/0328419 A1 | 11/2018 | Hand et al. |
| 2019/0170198 A1 | 6/2019 | Kimes |
| 2020/0325964 A1 | 10/2020 | Kimes |
| 2021/0041022 A1 | 2/2021 | Kimes et al. |

\* cited by examiner

Park on a Grade

Down Hill     Up Hill

COUPLING AND CONTROL ASSEMBLY INCLUDING CONTROLLABLE COUPLING ASSEMBLY HAVING SPEED SENSOR AND METHODS OF CONTROLLING THE CONTROLLABLE COUPLING ASSEMBLY USING INFORMATION FROM THE SPEED SENSOR FOR PARK/HILL-HOLD OPERATIONS

TECHNICAL FIELD

The present invention relates to coupling and control assemblies including controllable coupling assemblies having sensors and to methods of controlling the coupling assemblies using information from the sensors.

BACKGROUND

Coupling assemblies such as clutches are used in a variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. The clutch otherwise permits the driving member to freely rotate in the second direction relative to the driven member.

One type of one-way clutch (i.e., OWC) includes coaxial driving and driven plates having planar clutch faces in closely spaced, juxtaposed relationship. Pockets are formed in the face of the driving plate at angularly spaced locations about an axis, and a strut or pawl is disposed in each pocket. Notches are formed in the face of the driven plate and are engageable with one or more of the struts when the driving plate is rotating in a first direction. When the driving plate is rotating in a second direction opposite the first direction, the struts disengage the notches, thereby allowing free-wheeling motion of the driving plate with respect to the driven plate.

Controllable or selectable one-way clutches are a departure from traditional one-way clutch designs. Selectable OWCs add a second set of locking members in combination with a slide plate. The additional set of locking members plus the slide plate adds multiple functions to the OWC. Controllable OWCs are capable of producing a mechanical connection between rotating or stationary shafts in one or both directions. Also, controllable OWCs are capable of overrunning in one or both directions. A controllable OWC contains an externally controlled selection or control mechanism. Movement of this selection mechanism can be between two or more positions which correspond to different operating modes.

As used herein, the term "sensor" describes a circuit or assembly having a sensing element and other components. As used herein, the term "magnetic field sensor" describes a circuit or assembly having a magnetic field sensing element and electronics coupled to the magnetic field sensing element. Magnetic field sensors are used in a variety of applications, including an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field. As used herein, the term "magnetic field sensing element" describes a variety of electronic elements that can sense a magnetic field. The magnetic field sensing elements can be, but not limited to, Hall effect elements, magnetoresistance elements, or magneto-transistors.

Coupling assemblies are used in vehicle transmissions such as to prevent an interruption of drive torque (i.e., power flow) during certain gear shifts and to allow engine braking during coasting. Hybrid powertrains combine a conventional engine and an electric motor to produce a more efficient vehicle. Torque from the engine and the electric motor is channeled to the vehicle's driven wheels via the transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch", and "brake" may be used interchangeably.

SUMMARY

A coupling and control assembly includes a controllable coupling assembly, first and second electromechanical components, and a controller. The controllable coupling assembly includes a first coupling member and a second coupling member supported for rotation relative to the first coupling member about an axis. The first coupling member has a first coupling face oriented to face radially with respect to the axis and has a speed sensor. The second coupling member has a second coupling face oriented to face radially with respect to the axis and has locking formations. The coupling members are positioned relative to each other so that the speed sensor is in a close-spaced opposition to the locking formations. The first electromechanical component is configured to move a first locking element between (i) a coupling position in which the first locking element engages one of the locking formations to thereby prevent rotation of the second coupling member in a first direction about the axis and (ii) a non-coupling position in which the first locking element is disengaged from the locking formations. The second electromechanical component is configured to move a second locking element between (i) a coupling position in which the second locking element engages one of the locking formations to thereby prevent rotation of the second coupling member in a second direction opposite to the first direction about the axis and (ii) a non-coupling position in which the second locking element is disengaged from the locking formations. The speed sensor is configured to sense the locking formations rotate past the sensor as the second coupling member rotates relative to the first coupling member about the axis to generate a speed signal indicative of a speed of rotation of the second coupling member. The controller is operative to receive the speed signal from the speed sensor.

In an embodiment, the controller is configured to control one of the electromechanical components to move the locking element corresponding to the one of the electromechanical components from the non-coupling position to the coupling position and control the other one of the electromechanical components to maintain the locking element corresponding to the other one of the electromechanical components in the non-coupling position upon the speed of rotation of the second coupling member decreasing to be lower than a hill-hold speed threshold.

The controller may be further configured to control the one of the electromechanical components to move the locking element corresponding to the one of the electromechanical components from the coupling position back to the non-coupling position and control the other one of the electromechanical components to maintain the locking element corresponding to the other one of the electromechanical components in the non-coupling position upon the speed of rotation of the second coupling member subsequently increasing to be greater than the hill-hold speed threshold.

The controller may be further configured to control the first electromechanical component to move the first locking element from the non-coupling position to the coupling position and control the second electromechanical component to maintain the second locking element in the non-coupling position upon the speed of rotation of the second coupling member in the second direction decreasing to be lower than the hill-hold speed threshold to thereby prevent inadvertent rotation of the second coupling member in the first direction.

The controller may be further configured to control the second electromechanical component to move the second locking element from the non-coupling position to the coupling position and control the first electromechanical component to maintain the first locking element in the non-coupling position upon the speed of rotation of the first coupling member in the first direction decreasing to be lower than the hill-hold speed threshold to thereby prevent inadvertent rotation of the first coupling member in the second direction.

In an embodiment, additionally or alternatively, the controller is configured to, in response receiving a Park command, control the electromechanical components to move the locking elements from the non-coupling position to the coupling position while the speed of rotation of the second coupling member is less than a park speed threshold and, irrespective of receiving the Park command, control the electromechanical components to maintain the locking elements in the non-coupling position while the speed of rotation of the second coupling member is greater than the park speed threshold.

The controller may include a main controller, a first solenoid controller associated with the first electromechanical component, and a second solenoid controller associated with the second electromechanical component. The main controller is configured to, in response to receiving the Park command, provide a control signal to the solenoid controllers commanding the solenoid controllers to move the locking elements from the non-coupling position to the coupling position. The solenoid controllers are configured to, in response to the control signal, control the electromechanical components to move the locking elements from the non-coupling position to the coupling position while the speed of rotation of the second coupling member is less than the park speed threshold. The solenoid controllers are further configured to, in response to the control signal, ignore the control signal and maintain the locking elements in the non-coupling position while the speed of rotation of the second coupling member is greater than the park speed threshold.

In an embodiment, additionally or alternatively, the first coupling member may further have a position sensor configured to generate a position signal indicative of whether the second locking element is in the coupling or non-coupling position. The controller is operative to receive the position signal and may be further configured to, in response to receiving a Reverse command after the locking elements have been moved to the coupling position in response to the Park command, control the second electromechanical component to move the second locking element to the non-coupling position, control the first electromechanical component to maintain the first locking element in the coupling position, diagnose from the position signal that the second electromechanical component is stuck in the coupling position, command a torque increase from an electric motor based upon a condition to remove torque from the second locking element so that the second locking element is allowed to move to the non-coupling position, and control the first electromechanical component to move the first locking element to the non-coupling position after the second locking element is allowed to move to the non-coupling position as confirmed from the position signal.

In an embodiment, additionally or alternatively, the first coupling member may further have a position sensor configured to generate a position signal indicative of whether the first locking element is in the coupling or non-coupling position. The controller is operative to receive the position signal and may be further configured to, in response to receiving a Drive command after the locking elements have been moved to the coupling position in response to the Park command, control the first electromechanical component to move the first locking element to the non-coupling position, control the second electromechanical component to maintain the second locking element in the coupling position, diagnose from the position signal that the first electromechanical component is stuck in the coupling position, command a torque increase from an electric motor based upon a condition to remove torque from the first locking element so that the first locking element is allowed to move to the non-coupling position, and control the second electromechanical component to move the second locking element to the non-coupling position after the first locking element is allowed to move to the non-coupling position as confirmed from the position signal.

A method for use with the coupling and control assembly is also provided.

In an embodiment, the method includes controlling, by the controller, one of the electromechanical components to move the locking element corresponding to the one of the electromechanical components from the non-coupling position to the coupling position and controlling, by the controller, the other one of the electromechanical components to maintain the locking element corresponding to the other one of the electromechanical components in the non-coupling position upon the speed of rotation of the second coupling member decreasing to be lower than a hill-hold speed threshold.

In an embodiment, additionally or alternatively, the method may further include controlling, by the controller, the one of the electromechanical components to move the locking element corresponding to the one of the electromechanical components from the coupling position back to the non-coupling position and controlling, by the controller, the other one of the electromechanical components to maintain the locking element corresponding to the other one of the electromechanical components in the non-coupling position upon the speed of rotation of the second coupling member subsequently increasing to be greater than the hill-hold speed threshold.

In an embodiment, additionally or alternatively, the method may further include controlling, by the controller, in response receiving a Park command, the electromechanical components to move the locking elements from the non-coupling position to the coupling position while the speed of rotation of the second coupling member is less than a park speed threshold and controlling, by the controller, irrespective of receiving the Park command, the electromechanical components to maintain the locking elements in the non-coupling position while the speed of rotation of the second coupling member is greater than the park speed threshold.

In an embodiment, additionally or alternatively, the method may further include in response to receiving a Reverse command after the locking elements have been moved to the coupling position in response to the Park command, the controller controlling the second electromechanical component to move the second locking element to the non-coupling position, controlling the first electromechanical component to maintain the first locking element in the coupling position, diagnosing from the second position signal that the second electromechanical component is stuck in the coupling position, commanding a torque increase from an electric motor based upon a condition to remove torque from the second locking element so that the second locking element is allowed to move to the non-coupling position, and controlling the first electromechanical component to move the first locking element to the non-coupling position after the second locking element is allowed to move to the non-coupling position as confirmed from the second position signal.

In an embodiment, additionally or alternatively, the method may further include in response to receiving a Drive command after the locking elements have been moved to the coupling position in response to the Park command, the controller controlling the first electromechanical component to move the first locking element to the non-coupling position, controlling the second electromechanical component to maintain the second locking element in the coupling position, diagnosing from the first position signal that the first electromechanical component is stuck in the coupling position, commanding a torque increase from an electric motor based upon a condition to remove torque from the first locking element so that the first locking element is allowed to move to the non-coupling position, and controlling the second electromechanical component to move the second locking element to the non-coupling position after the first locking element is allowed to move to the non-coupling position as confirmed from the first position signal.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
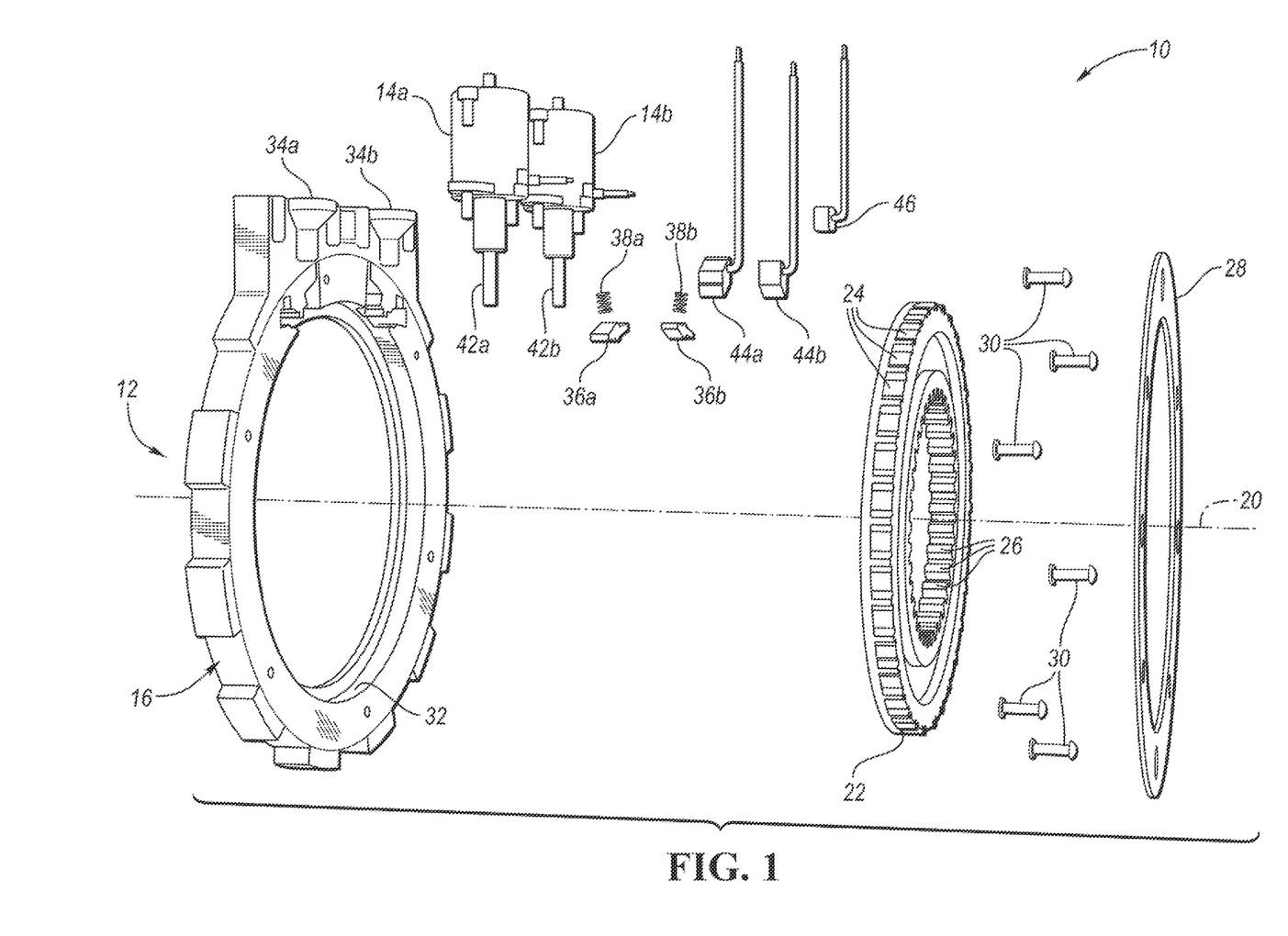
FIG. 1 illustrates an exploded view of a coupling and control assembly having a controllable coupling assembly and a pair of electromechanical components in accordance with an embodiment.
Figure 2:
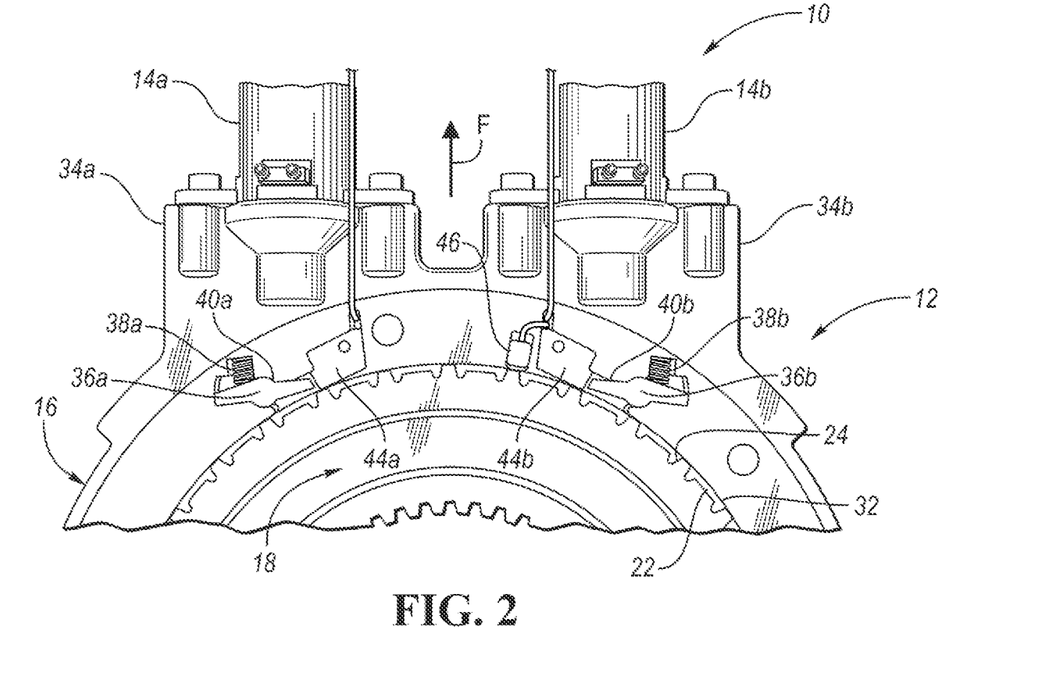
FIG. 2 illustrates a cross-sectional, partial view of the coupling and control assembly with both electromechanical components in a magnetically latched-off position whereby the controllable coupling assembly is in a fully "overrun" operating mode.
Figure 3:
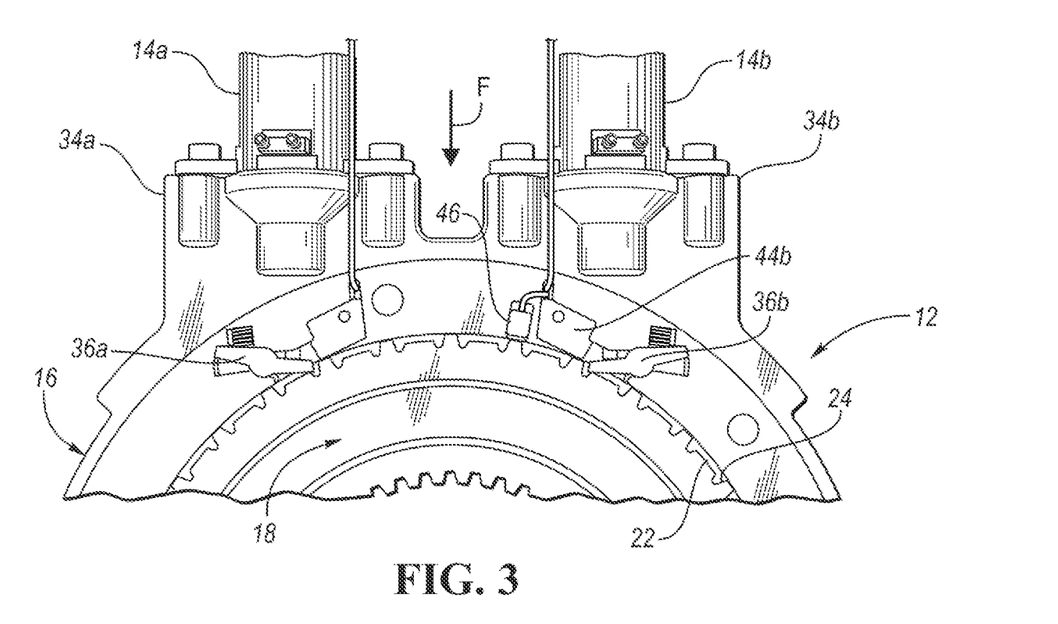
FIG. 3 illustrates a cross-sectional, partial view of the coupling and control assembly with both electromechanical components in a magnetically latched-on position whereby the controllable coupling assembly is in a fully "locked" operating mode.

Referring now to FIGS. 1, 2, and 3, a coupling and control assembly 10 in accordance with an embodiment is shown. FIG. 1 illustrates an exploded view of coupling and control assembly 10. FIGS. 2 and 3 illustrate respective, cross-sectional, partial views of coupling and control assembly 10. As explained below, in FIG. 2 controllable coupling assembly 12 is in a fully "overrun" operating mode and in FIG. 3 controllable coupling assembly 12 is in a fully "locked" operating mode.

Coupling and control assembly 10 includes a controllable coupling assembly 12. Controllable coupling assembly 12 includes first and second coupling members 16 and 18. First coupling member 16 is fixed in position, such as being fixed to a transmission case. Second coupling member 18 is mounted for rotation relative to first coupling member 16 about a rotational axis 20.

Second coupling member 18 includes a coupling face 22 oriented to face radially-outward away from rotational axis 20. Coupling face 22 of second coupling member 18 has a set of locking formations, teeth, or notches ("notches) 24 formed therein. Second coupling member 18 has a set of splines 26 formed on its inner diameter for drivingly engaging a drive or driven member (not shown) for rotation about rotational axis 20. As coupling face 22 of second coupling member 18 has notches 24, the second coupling member may be referred to herein as a "notch plate".

Controllable coupling assembly 12 further includes a locking or retainer ring or plate ("retainer plate") 28 for insertion into an annular groove of an axially extending wall of first coupling member 16 to hold coupling members 16 and 18 together. Rivets 30 are employed to affix retainer plate 28 to first coupling member 16 for this purpose.

First coupling member 16 includes a coupling face 32 oriented to face radially-inward toward rotational axis 20. Radially-inward facing coupling face 32 of first coupling member 16 and radially-outward facing coupling face 22 of second coupling member 18 face one another when controllable coupling assembly 12 is assembled, as shown in FIGS. 2 and 3.

First coupling member 16 has a pair of raised, receiving portions 34a, 34b on its outer diameter. Each receiving portion 34a, 34b has a slit (not shown). The slits of receiving portions 34a, 34b extend completely through first coupling member 16 to radially-inward facing coupling face 32 of the first coupling member.

First coupling member 16 further includes a pair of locking elements, struts, or pawls ("locking struts") 36a, 36b. As shown in FIGS. 2 and 3, locking struts 36a, 36b are respectively disposed within pockets 40a, 40b of receiving portions 34a, 34b of first coupling member 16. Strut return springs 38a, 38b are respectively associated with locking struts 36a, 36b. As further shown in FIGS. 2 and 3, strut return springs 38a, 38b are respectively disposed within spring recesses (not numbered) of receiving portions 34a, 34b and are in operative arrangement with their respective locking struts 36a, 36b. As receiving portions 34a, 34b of first coupling member 16 has pockets 40a, 40b for housing locking struts 36a, 36b, the first coupling member may be referred to herein as a "pocket plate."

Locking struts 36a, 36b can extend between radially-inward facing coupling face 32 of first coupling member 16 and radially-outward facing coupling face 22 of second coupling member 18, respectively, between a non-coupling (or uncoupling) position, shown in FIG. 2, and a coupling position, shown in FIG. 3, when controllable coupling assembly 12 is assembled.

As indicated, each locking strut 36a, 36b is movable between first (i.e., non-coupling) and second (i.e., coupling) positions. The first position, shown in FIG. 2, is characterized by non-abutting engagement of a locking strut 36 with a load-bearing surface of the corresponding pocket 40 of first coupling member 16 and a load-bearing shoulder of a notch 24 of second coupling member 22. The second position, shown in FIG. 3, is characterized by abutting engagement of a locking strut 36 with a load-bearing surface of the corresponding pocket 40 of first coupling member 16 and a load-bearing shoulder of a notch 24 of second coupling member 22.

Controllable coupling assembly 10 further includes a pair of electromechanical components 14a, 14b (also referred to herein as "solenoids"). Electromechanical components 14a, 14b respectively include a reciprocating member (e.g., plunger, rod, etc.) 42a, 42b. Reciprocating members 42a, 42b are movable between extended and retracted positions.

As shown in FIGS. 2 and 3, electromechanical components 14a, 14b are respectively received by receiving portions 34a, 34b of first coupling member 16. Reciprocating member 42 of an electromechanical component 14 may reciprocate in the slit of the corresponding receiving portion 34. For instance, reciprocating member 42a may reciprocate to move locking strut 36a disposed in pocket 40a of receiving portion 34a across a gap between radially-facing coupling faces 32 and 22 of first and second coupling members 16 and 18 in response to electromechanical component 14a receiving an electrical control signal. In this case, locking strut 36a abuttingly engages one of notches 24 of second coupling member 18 in a coupling position of locking strut 36a, shown in FIG. 3, to prevent counter-clockwise (CCW) rotation of second coupling member 18 about rotational axis 20. Likewise, reciprocating member 42b may reciprocate to move locking strut 36b disposed in pocket 40b of receiving portion 34b across a gap between radially-facing coupling faces 32 and 22 of first and second coupling members 16 and 18 in response to electromechanical component 14b receiving an electrical control signal. In this case, locking strut 36b abuttingly engages one of notches 24 of second coupling member 18 in a coupling position of locking strut 36b, shown in FIG. 3, to prevent clockwise (CW) rotation of second coupling member 18 about rotational axis 20.

As described, with reference to FIG. 3, locking strut 36a in the coupling position prevents CCW rotation of second coupling member 18 and locking strut 36b in the coupling position prevents CW rotation of second coupling member 18. Thus, locking strut 36a may be referred to a "forward" locking strut and locking strut 36b may be referred to as a "reverse" locking strut. Of course, depending on naming convention, locking strut 36a may instead be referred to a "reverse" locking strut and locking strut 36b may be referred to as a "forward" locking strut.

Each electromechanical component 14 preferably includes an electromagnetic solenoid including a housing having a bottom part with an aperture in which reciprocating member 42 reciprocates at a first end and a magnetic coil supported within the housing. An armature is supported for axial movement within the housing between first and second positions when the magnetic coil is energized with a predetermined electrical current. The distance between the first and second positions defines a stroke length wherein the armature exerts a substantially constant force along its stroke length during axial movement of the armature between the first and second positions. Reciprocating member 42 is biased by a spring which extends between the reciprocating member and the armature to move axially between first and second positions. This spring biases reciprocating member 42 towards second coupling member 18. Each electromechanical component 14 may each be referred to as a selectable solenoid insert (SSI).

Controllable coupling assembly 10 further includes a pair of position sensors 44a, 44b. Position sensors 44a, 44b are operable for respectively sensing the position of locking struts 36a, 36b. Particularly, position sensors 44a, 44b are operable for respectively sensing whether locking struts 36a, 36b are retracted to be in the non-coupling position (shown in FIG. 2) or are extended to be in the coupling position (shown in FIG. 3). To this end, preferably, position sensors 44a, 44b are magnetic field sensors and locking struts 36a, 36b are ferromagnetic or magnetic. Alternatively, one of or both locking struts 36a, 36b may carry or support a rare-earth, automotive grade, magnet or pellet (not shown) which may be embedded in a hole formed in the outer surface of the locking strut. In this case, the locking strut is a non-ferrous strut such as an aluminum strut.

A variable magnetic field is generated in response to movement of a locking strut 36 between the coupling and uncoupling positions. As shown in FIGS. 2 and 3, position sensor 44a is disposed within a recess of first coupling member 16 adjacent and stationary with respect to locking strut 36a. Position sensor 44a may thereby sense magnetic flux to produce an output signal which is based on the position of locking strut 36a. Likewise, as shown in FIGS. 2 and 3, position sensor 44b is disposed within a recess of first coupling member 16 adjacent and stationary with respect to locking strut 36b. Position sensor 44b may thereby sense magnetic flux to produce an output signal which is based on the position of locking strut 36b.

Each position sensor 44 typically has three wires (input, output, and ground) and provides an industry standard, push-pull voltage output based on position of the corresponding locking strut 36. Position sensor 44 accurately detects the position of the corresponding locking strut 36 with a single output (i.e., voltage output). The wires of position sensor 44 extend from the position sensor out through the corresponding receiving portion 34 of first coupling member 16. The wires are connected to a solenoid controller (shown in FIG. 4) which is coupled to a main controller (shown in FIG. 4). The solenoid controller supplies drive signals to the magnetic coil of the solenoid of electromechanical component 14 to move reciprocating member 42 accordingly in response to control signals from the main controller. By providing feedback regarding the position of locking struts 36a, 36b, the resulting closed-loop control system has improved sensitivity, accuracy, and repeatability. As described, and as shown in FIGS. 2 and 3, position sensor 44a, 44b are integrated in first coupling member 16.

Controllable coupling assembly 10 further includes a speed sensor 46. Speed sensor 46 is operable for sensing speed of notches 24 of second coupling member 18 as notches 24 rotate past speed sensor 46 as second coupling member 18 rotates relative to first coupling member 16 about rotational axis 20. As such, speed sensor 46 is operable for measuring the speed of rotation of second coupling member 18. To this end, preferably, speed sensor 46 is a magnetic field sensor and notches 24 are ferromagnetic or magnetic. Alternatively, notches 24 may carry or support a rare-earth, automotive grade, magnet or pellet (not shown) which may be embedded in a hole formed in the outer surface of the notches. In this case, notches 24 may be non-ferrous notches such as aluminum notches.

A variable magnetic field is generated in response to rotation of notches 24 past speed sensor 46. As shown in FIGS. 2 and 3, speed sensor 46 is disposed within a recess of first coupling member 16 adjacent and stationary with respect to notches 24 located on radially-outward facing coupling face 22 of second coupling member 18. Speed sensor 46 may thereby sense magnetic flux to produce an output signal which is based on the speed of rotation of second coupling member 18 as notches 24 rotate past speed sensor 46 while the second coupling member 18 rotates relative to first coupling member 16 about rotational axis 20.

Speed sensor 46 typically has two wires and provides a current output based on speed of rotation of notches 24 past the speed sensor. Speed sensor 46 accurately detects the speed with a single output (i.e., current output). The wires of speed sensor 46 extend from the speed sensor out through the corresponding receiving portion 34 of first coupling member 16. The wires are connected to the solenoid controller (shown in FIG. 4) which is coupled to the main controller (shown in FIG. 4). The solenoid controller supplies drive signals to the magnetic coil of the solenoid of electromechanical component 14 to move reciprocating member 42 accordingly in response to control signals from the main controller. By providing feedback regarding the speed of rotation of second coupling member 18, the resulting closed-loop control system has improved sensitivity, accuracy, and repeatability. As described, and as shown in FIGS. 2 and 3, speed sensor 46 is integrated in first coupling member 16.

As described with reference to FIGS. 1, 2, and 3, coupling and control assembly 10 has the features of being an electronically-controlled clutch brake with radial torque transmitting elements (i.e., locking struts 36a, 36b). A first solenoid (i.e., electromechanical component 14a) controls a first radial strut (i.e., locking strut 36a) by pushing the first strut into a notch plate (i.e., a notch 24 of second coupling member 18) so that it can transmit torque or prevent rotation of the notch plate in a first direction (i.e., the counter-clockwise (CCW) direction). Likewise, a second solenoid (i.e., electromechanical component 14b) controls a second radial strut (i.e., locking strut 36b) by pushing the second strut into the notch plate (i.e., a notch 24 of second coupling member 18) so that it can transmit torque or prevent rotation in a second direction opposite to the first direction (i.e., the clockwise (CW) direction). Of course, an additional solenoid and strut set(s) may be provided for the CCW direction and/or an additional solenoid and strut set(s) may be provided for the CW direction.

In sum, as described, in FIG. 2, solenoids 14 are magnetically latched-in an off position, pursuant to the magnetic latch force F. As such, reciprocating members 42 are retracted and do not contact locking struts 36. Consequently, strut return springs 38 are extended with locking struts 36 being disengaged from notches 24 and not transmitting torque. Position sensors 44 detect locking struts 36 being in the OFF position. Consequently, second coupling member 18 can rotate in both the CW and CCW directions (i.e., "freewheel" in CW or CCW directions).

In sum, as described, in FIG. 3, solenoids 14 are magnetically latched-in an on position, pursuant to the magnetic latch force F. As such, reciprocating members 42 are extended and contact locking struts 36. Consequently, strut return springs 38 are compressed with locking struts 36 engaged to notches 24 and transmitting torque. Position sensors 44 detect locking struts 36 being in the ON position. Consequently, first and second coupling members 16 and 18 are locked together and grounded to the transmission case. As such, second coupling member 18 cannot rotate in either the CW or CCW directions.

As such, first and second solenoid and strut sets respectively exist for the CCW and CW directions, thereby resulting in at least two solenoids and at least two radial strut sets for coupling and control assembly 10. The first and second solenoids can be energized together or independently to provide four modes of operation: (1) freewheel both CW and CCW directions (second coupling member 18 rotatable in both CW and CCW directions—both first and second struts 36a, 36b are in non-coupling position); (2) one-way clutch CCW (second coupling member 18 rotatable in CCW direction and locked in CW direction—first strut 36a in non-coupling position and second strut 36b in coupling position); (3) one-way clutch CW (second coupling member 18 rotatable in CCW direction and locked in CCW direction—first strut 36a in coupling position and second strut 36b in non-coupling position); and (4) locked both CW and CCW directions (second coupling member 18 locked in both CW and CCW directions—both first and second struts 36a, 36b are in coupling position).

These modes of operation allow controllable coupling assembly 12 to transmit torque (i.e., gearbox) or prevent rotation (i.e., park lock and hill-hold). As described, each strut has an associated position sensor to determine the state of that individual strut, i.e., ON or OFF, where ON means the strut is in the coupling position and OFF means the strut is in the non-coupling position. As further described, a speed sensor is in the grounded race (i.e., speed sensor 46 integrated in first coupling member 16) to measure the speed of the rotating race relative to the fixed race (i.e., to measure the speed of rotation of second coupling member 18 relative to first coupling member 16). Embodiments provide control strategies for when to energize the solenoids using information from the sensors.

Figure 4:
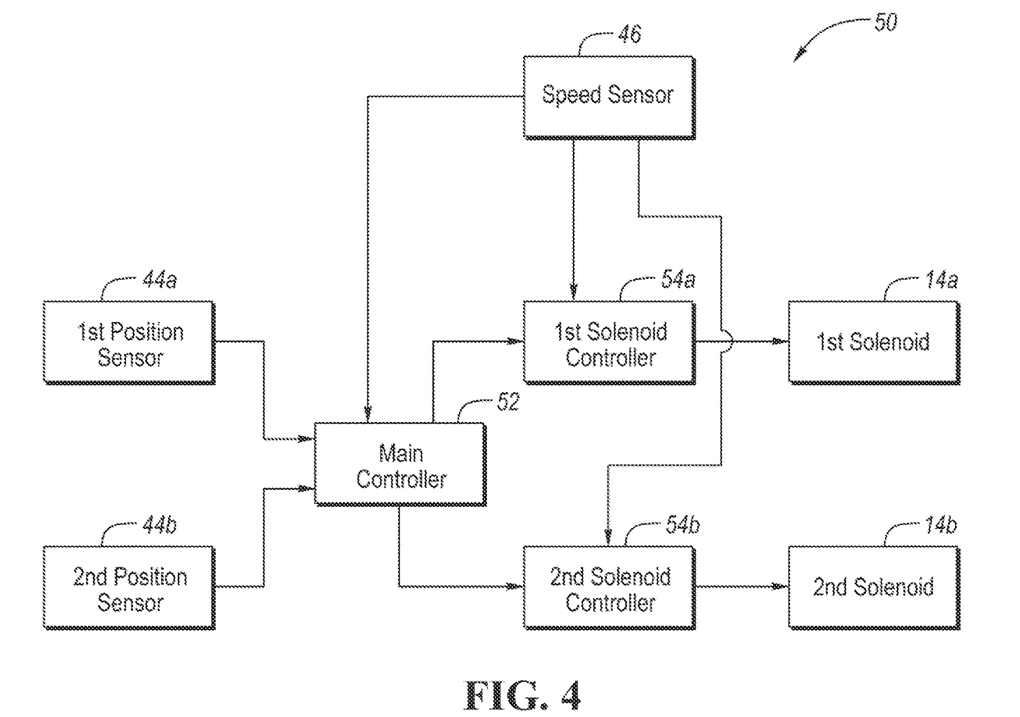
FIG. 4 illustrates a block diagram of (i) components of the coupling and control assembly including position sensors and a speed sensor of the controllable coupling assembly and the electromechanical components and (ii) components of a control system including a main controller and solenoid controllers for controlling the electromechanical components using information from the position and speed sensors to control the controllable coupling assembly.

Referring now to FIG. 4, with continual reference to FIGS. 1, 2, and 3, a block diagram of components of coupling and control assembly 10 and components of a control system 50 to control controllable coupling assembly 12 is shown. Control system 50 is a part of coupling and control assembly 10. The components of coupling and control assembly 10 shown in FIG. 4 are first and second strut position sensors 44a, 44b and speed sensor 46 of controllable coupling assembly 12 and first and second solenoids 14a, 14b. The components of control system 50 shown in FIG. 4 are a main controller 52 and first and second solenoid controllers 54a, 54b. In general, main controller 52 and/or solenoid controllers 54a, 54b are operable for controlling electromechanical components 14a, 14b using information from position sensors 44a, 44b and/or speed sensor 46 to control controllable coupling assembly 12.

Main controller 52 and solenoid controllers 54a, 54b are electronic devices such as processors, micro-controllers, or the like (e.g., micro-computers). Main controller 52 (e.g., a vehicle controller) includes motor and engine controls or control logic which perform control functions including a transmission control algorithm. As indicated in FIG. 4, main controller 52 is operable to provide control signals to solenoid controllers 54a, 54b for the solenoid controllers to control solenoids 14a, 14b accordingly.

Solenoid controllers 54a, 54b are "on-board" solenoids 14a, 14b, respectively. Solenoid controllers 54a, 54b control solenoids 14a, 14b in accordance with the control signals from main controller 52 by providing drive signals to the solenoids. Solenoid controllers 54a, 54b include solenoid controls or control logic for respectively controlling solenoids 14a, 14b with the drive signals to move reciprocating members 42a, 42b between extended and retracted positions. As described above, when a reciprocating member 42 is in the extended position the reciprocating member contacts the associated locking strut 36 to move the locking strut to the coupling position. Conversely, as described above, when a reciprocating member 42 is in the retracted position the reciprocating member does not contact the associated locking strut 36 and the locking strut is biased by the corresponding return spring 38 into the non-coupling position. As such, controllable coupling assembly 12 changes between fully locked, CW locked, CCW locked, and fully overrun positions in response to drive signals from solenoid controllers 54a, 54b, which provide the drive signals in response to control signals from main controller 52.

As indicated in FIG. 4, solenoid controllers 54a, 54b receive information indicative of the speed of rotation of second coupling member 18 from speed sensor 46. In this regard, the wiring of speed sensor 46 conveying the speed sensor signal of speed sensor 46 is connected to solenoid controllers 54a, 54b. As such, solenoid controllers 54a, 54b are arranged to be apprised of the speed of rotation of second coupling member 18 (i.e., the differential speed between second coupling member 18 and (fixed) first coupling member 16).

As further indicated in FIG. 4, main controller 52 receives information indicative of the speed of rotation of second coupling member 18. In this regard, at least one of solenoid controllers 54a, 54b passes the speed sensor signal to main controller 52 (not shown in FIG. 4). As such, main controller 52 is arranged to be apprised of the speed of rotation of second coupling member 18 (i.e., the differential speed between second coupling member 18 and (fixed) first coupling member 16).

As further indicated in FIG. 4, main controller 52 receives information indicative of the position of first strut 36a from first position sensor 44a and receives information indicative of the position of second strut 36b from second position sensor 44b. In this regard, the wiring of position sensors 44a, 44b conveying the strut position signals is respectively connected to solenoid controllers 54a, 54b which, in turn, pass the strut position signals to main controller 52 (not shown in FIG. 4). As such, main controller 52 is arranged to be apprised of the position (i.e., ON or OFF) of each locking strut 36a, 36b.

In an embodiment, coupling and control assembly 10 is used in a transmission of a powertrain of a vehicle. The powertrain includes an electric motor arranged to provide torque to second coupling member 18 of controllable coupling assembly 12. The powertrain may further include an engine whereby the vehicle may be a hybrid electric vehicle (REV). Alternately, the powertrain may be devoid of an engine whereby the vehicle may be a battery electric vehicle (BEV). Torque from the electric motor and the engine, if present, is channeled to the vehicle's driven wheels via the transmission.

Figure 5:
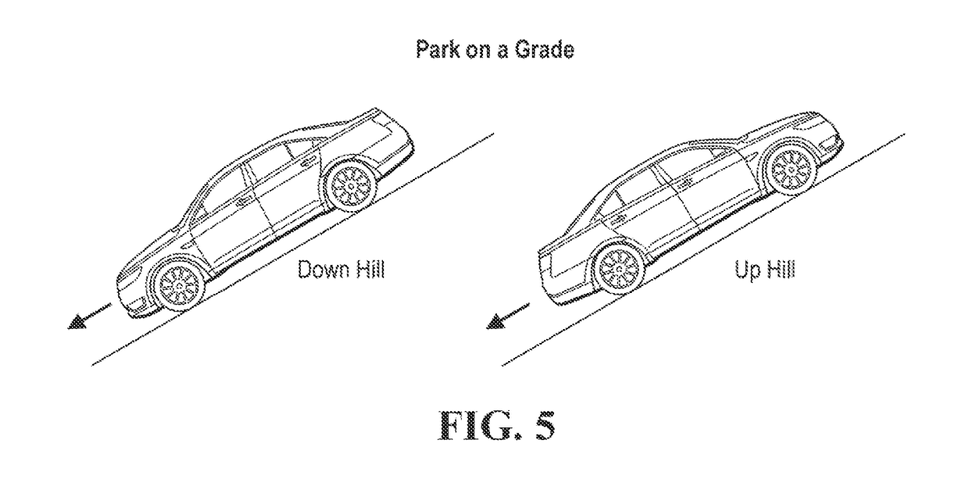
FIG. 5 illustrates schematic views of a motor vehicle parked (in Park) on a grade facing both downhill and uphill.

A challenge is how to "get off" a coupling assembly such as controllable coupling assembly 12 carrying torque such as when the vehicle is in Park. The challenge is how to seamlessly control Park (i.e., shift out of Park) especially when the vehicle is parked on an incline such as a hill as shown in FIG. 5. In general, when the vehicle is engaged in Park, one side of the coupling assembly will be loaded. The side loaded will depend on grade direction. So, when coming out of Park a given coupling assembly going from a 11 state to a 00 state will usually yield a 01 or 10 mechanical state. If a strut is loaded due to grade, then it will not turn OFF. Thus, a procedure needs to be followed to unlock a strut (coming out of Park) without moving or disturbing the vehicle and without perception from the operator.

With reference to FIG. 5, further explanation of the loaded side of a coupling assembly such as controllable coupling assembly 12 is as follows. While the vehicle is in Park, first and second locking struts (akin to locking struts 36a, 36b) are ON. While the vehicle is in Park on a downhill grade, as shown in FIG. 5, both locking struts are ON with the first locking strut being loaded. Subsequently, when the locking struts are commanded to go from the ON state (11) to the OFF state (00), only the second locking strut will turn OFF. The electric state of the coupling assembly will be OFF, but the coupling assembly will have a mechanical state of stuck ON (10). Conversely, while the vehicle is in Park on an uphill grade, as shown in FIG. 5, both locking struts are ON with the second locking strut being loaded. Subsequently, when the locking struts are commanded to go from the ON state (11) to the OFF state (00), only the first locking strut will turn OFF. The electric state of the coupling assembly will be OFF, but the coupling assembly will have a mechanical state of stuck ON (01).

In order to turn OFF the stuck strut, the stuck strut has to be unloaded. The road grade (i.e., downhill or uphill) causes the weight of the vehicle to keep the stuck strut ON. For instance, assume the vehicle forward facing direction is downhill. In this case, if the desired direction is reverse (REV), then when the driver pushes the accelerator pedal the vehicle will start to move in reverse and the stuck strut will come OFF. However, the problem is when the desired direction is forward (FRD) as the way to go forward is to first go in reverse to turn OFF the stuck strut preventing forward movement. Conversely, assume the vehicle forward facing direction is uphill. In this case, if the desired direction is FWD, then when the driver pushes the accelerator pedal the vehicle will start to move forward and the stuck strut will come OFF. However, the problem is when the desired direction is REV as the way to go in reverse is to first go forward to turn OFF the stuck strut preventing reverse movement.

Control system 50 is operable to control controllable coupling assembly 12 using information from position sensors 44a, 44b and speed sensor 46 to address the challenge of how to "get off" the controllable coupling assembly carrying torque.

In an embodiment, control system 50 utilizes a closed loop control strategy for getting off controllable coupling assembly 12 when a side of the controllable coupling assembly is carrying torque. In operation, when coming out of Park, the intent of the driver is passed to main controller 52 as a P-R shift will have a different procedure than a P-D shift. Thus, the first step in the procedure is to determine the ending PRND position and pass that data to main controller 52. In the closed loop control, position sensors 44a, 44b pass the positions of locking struts 36a, 36b to main controller 52. This is the feedback signal during the shift.

For this general description of a shift out of Park, it is assumed that the vehicle is pointed downhill and a P-D shift was executed. As the vehicle is in Park, both locking struts 36a, 36b are ON. As the vehicle is pointed downhill and as the vehicle is to be driven forward out of Park, locking strut 36a is carrying torque. The closed loop control strategy performed by control system 50 has the following steps. Since Drive was selected, main controller 52 will turn OFF locking strut 36a while locking strut 36b remains kept ON. However, as locking strut 36a is carrying torque, the locking strut 36a is stuck ON. The ON locking strut 36b prevents the vehicle from moving in the reverse direction. Main controller 52 then causes the electric motor to start ramping reverse torque. While the electric motor provides reverse torque, the position of stuck ON locking strut 36a is monitored using position sensor 44a. Eventually enough reverse torque will be applied to release stuck ON locking strut 36a. Even though reverse torque was applied, the vehicle could not move due to locking strut 36b being kept ON and thereby preventing the vehicle from moving in the reverse direction. Once stuck ON locking strut 36a is free and turns OFF, position sensor 44a will send that data to main controller 52 communicating that locking strut 36a is no longer stuck. Immediately, reverse torque from the electric motor will be stopped and main controller 52 will turn OFF the other locking strut (i.e., main controller 52 will turn OFF locking strut 36b). Motor control is passed back to the vehicle driver and will respond to the accelerator pedal of the vehicle. At this point, the vehicle is out of Park and is in Drive. This procedure will shift the vehicle out of Park smoothly regardless of grade magnitude or direction.

Figure 6:
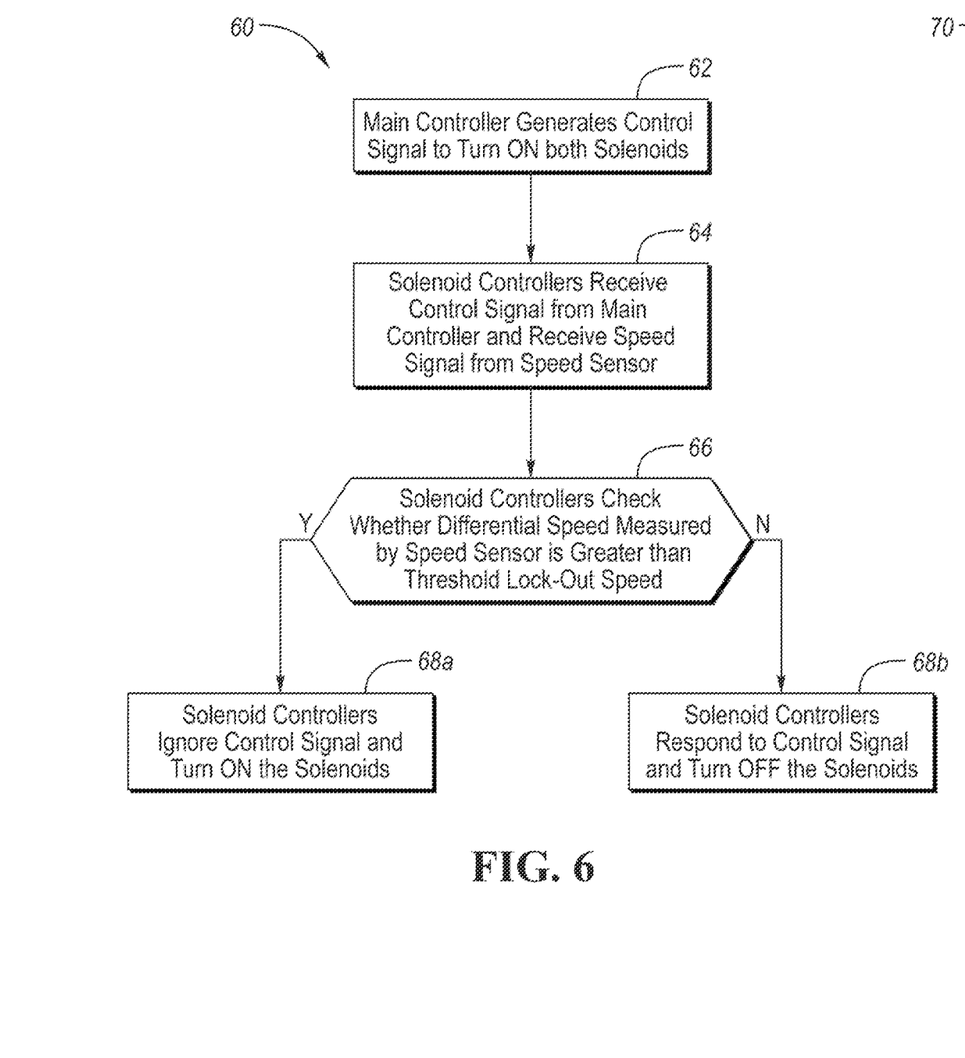
FIG. 6 illustrates a flowchart depicting representative operations of controlling the controllable coupling assembly for a parking engagement control process using information from the speed sensor in accordance with an embodiment.

Referring now to FIG. 6, a flowchart 60 depicting representative operations of controlling controllable coupling assembly 12 for a parking engagement control process using information from speed sensor 46 is shown. The parking engagement control process is to prevent the vehicle from going into Park at an unsafe speed. The vehicle goes into Park by turning ON both locking struts 36a, 36b.

Initially, it is noted that certain park systems use a park pawl. Such park systems are designed to not engage above a designed vehicle speed such as 3 mph. If an attempt is made to engage a park pawl above this speed, then the pawl will ratchet against the park gear and will not engage.

That function in this disclosure is provided by speed sensor 46 reading the speed of second coupling member 18. Speed sensor 46 reports the differential speed between second coupling member 18 and (fixed) first coupling member 16. If this relative speed of rotation between second coupling member 18 and first coupling member 16 is greater than a threshold lock-out speed, then solenoids 14a, 14b will not be energized to turn ON locking struts 36a, 36b. More particularly, if this differential speed is greater than the threshold lock-out speed, then solenoid controllers 54a, 54b will not energize solenoids 14a, 14b irrespective of any command from main controller 52 to do so. This thereby provides a sort of "electronic" ratcheting analogous to the mechanical ratcheting that occurs in the above-noted park systems in which the pawl will ratchet against the park gear and will not engage. Unlike the mechanical ratcheting, the electronic ratcheting does not result in any mechanical wear or tear on the locking struts and/or the notches and does not have any mechanical clicking sound.

As shown in FIG. 6, the parking engagement control process initiates with main controller 52 generating a control signal to turn ON both solenoids 14a, 14b, as indicated in block 62. Main controller 52 generates this control signal in response to vehicle driver command to put the vehicle in Park. Solenoid controllers 54a, 54b receive the control signal from main controller 52 and receive the speed signal from speed sensor 46, as indicated in block 64. The speed signal is indicative of the differential speed between second coupling member 18 and (fixed) first coupling member 16. Solenoid controllers 54a, 54b check whether the differential speed (i.e., speed of rotation of second coupling member 18 relative to first coupling member 16) is greater than a threshold lock-out speed, as indicated in block 66. The threshold lock-out speed may correspond to a vehicle speed such as 3 mph.

If the differential speed is greater than the threshold lock-out speed, then solenoid controllers 54a, 54b ignore the control signal from main controller 52 and do not energize solenoids 14a, 14b, as indicated in block 68a. In this case, solenoids 14a, 14b remain OFF and locking struts 36a, 36b thereby remain in the non-coupling position. The vehicle is thereby prevented from going into Park.

If the differential speed is less than the threshold lock-out speed, then solenoid controllers 54a, 54b respond to the control signal from main controller 52 and energize solenoids 14a, 14b, as indicated in block 68b. In this case, solenoids 14a, 14b are turned ON and locking struts 36a, 36b thereby move into the coupling position. The vehicle is thereby put into Park.

Figure 7:
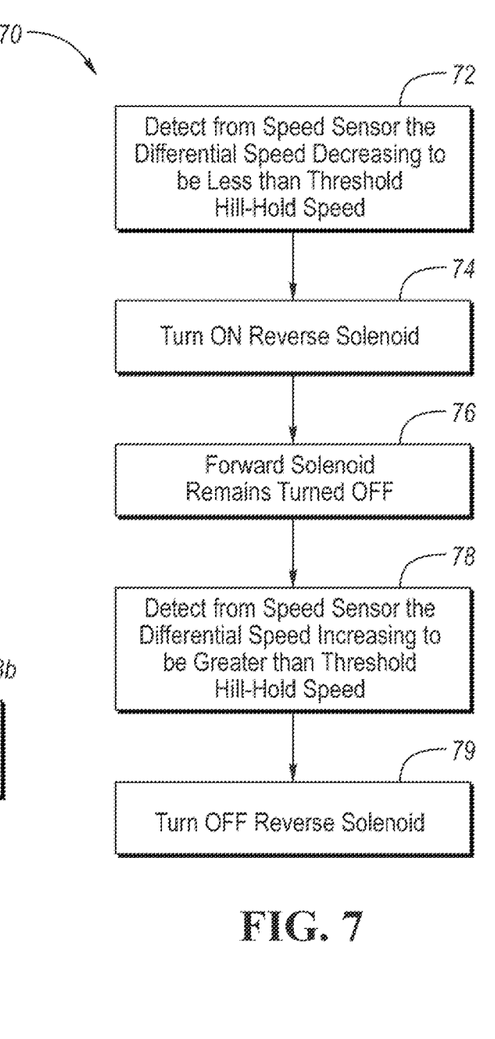
FIG. 7 illustrates a flowchart depicting representative operations of controlling the controllable coupling assembly for a hill-hold control process using information from the speed sensor in accordance with an embodiment.

Referring now to FIG. 7, a flowchart 70 depicting representative operations of controlling controllable coupling assembly 12 for a hill-hold control process using information from speed sensor 46 is shown. As such, speed sensor 46 has another function of providing a passive hill-hold function.

In operation, while the vehicle is in first gear and is coasting or braking to a stop, speed sensor 46 will detect when the differential speed is below a hill-hold speed threshold. When these conditions are met, control system 50 selectively energizes the solenoid which prevents the vehicle from rolling backward. The other solenoid which would prevent motion in the forward direction remains unenergized. This results in the vehicle being able to drive forward but lock when rolling backwards. Speed sensor 46 detects when the differential speed increases over the hill-hold speed threshold. Upon the differential speed increasing over the hill-hold speed threshold, control system 50 triggers the energized solenoid to turn OFF.

Particularly, as shown in FIG. 7, the hill-hold control process initiates with main controller 52 receiving the speed signal from speed sensor 46 and detecting therefrom when the differential speed decreases to be less than the hill-hold speed threshold, as indicated in block 72. Upon the differential speed decreasing to be less than the hill-hold speed threshold, main controller 52 generates a control signal for solenoid controller 54b to turn ON its solenoid 14b to move reverse locking strut 36b to the coupling position to thereby prevent the vehicle from rolling backwards, as indicated in block 74. Solenoid 14a which corresponds to forward locking strut 36a, which would prevent motion in the forward direction when energized, remains OFF as indicated in block 76. Blocks 74 and 76 result in the vehicle being able to drive forward but lock when rolling backwards. Main controller 52 continually receives the speed signal from speed sensor 46 and detects therefrom when the differential speed increases to be greater than the hill-hold speed threshold, as indicated in block 78. Upon the differential speed increasing over the hill-hold speed threshold, main controller 52 generates a control signal for solenoid controller 54b to turn OFF its solenoid 14b to move reverse locking strut 36b to the non-coupling position, as indicated in block 79. The hill-hold speed threshold may correspond to a vehicle speed such as 3 mph.

Coupling and control assembly 10 with speed sensor 46 has a NVH benefit current park systems. When the current park pawl is ON and reacting torque from the vehicle from either being on a slope or forced against a curb, energy is stored in the driveline. When the park pawl is pulled out of park, this stored energy is released, sometimes violently, causing a loud audible clunk. OEMs have attempted to address this issue with complicated hydraulic controls only to cause this stored energy to be redirected into other components in the transmission resulting in failures. This disclosure shows how control strategies coupled with the capability of a 4-position clutch in a BEV or HEV manages that stored energy and dissipates it without any violent transference into the transmission or vehicle. The result is a seamless and quiet disengagement of park on any grade or preloaded condition.

Figure 8A:
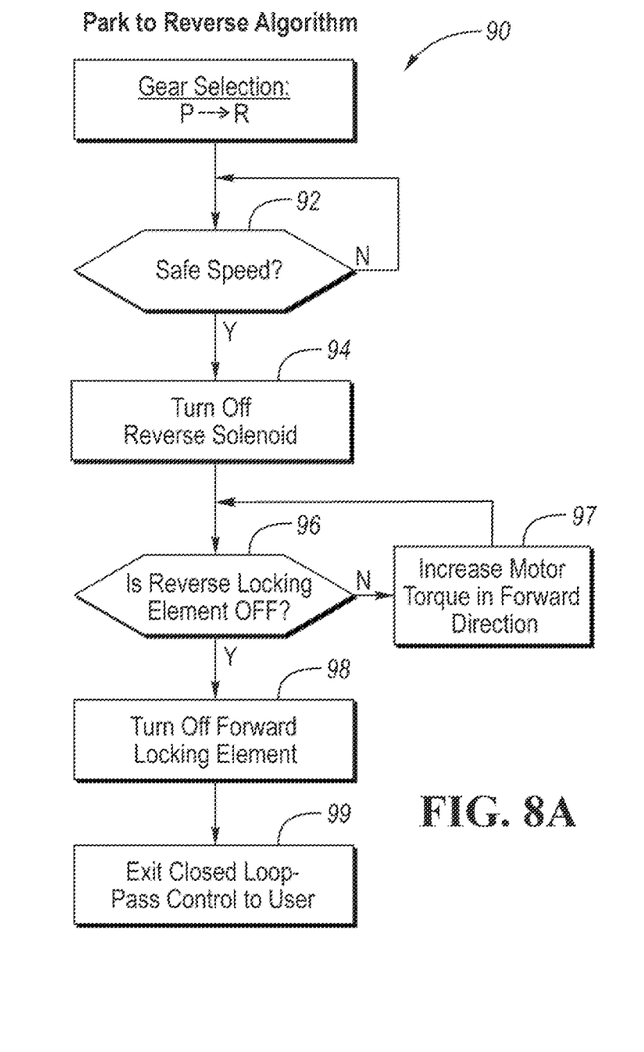
FIG. 8A illustrates a flowchart depicting representative operations of controlling the controllable coupling assembly for a "park-to-reverse" control process using information from the position and speed sensors in accordance with an embodiment.

Referring now to FIG. 8A, a flowchart 90 depicting representative operations of controlling controllable coupling assembly 12 for a "park-to-reverse" control process using information from position sensors 44a, 44b and speed sensor 46 is shown. Initially, as represented by decision block 92, the parking engagement control process described with reference to FIG. 6 is conducted to put the vehicle into Park. In Park, both solenoids 14a, 14b are turned ON. The control process for moving the vehicle out of Park and into Reverse then initiates with main controller 52 turning OFF reverse solenoid 14b, as indicated in block 94. Main controller 52 uses position sensor 44b to determine whether reverse solenoid 14b has been turned OFF or is stuck ON, as indicated in decision block 96. While reverse solenoid 14b is stuck ON, main controller 52 causes the electric motor to ramp forward torque, as indicated in block 97. Eventually enough forward torque will be applied to release reverse solenoid 14b. Thereupon, main controller 52 will turn OFF forward solenoid 14a, as indicated in block 98, and motor control will be passed back to the vehicle driver, as indicated in block 99. At this point, the vehicle is out of Park and is in Reverse. As described, while ramping the electric motor in the forward direction, forward solenoid 14a being left ON will prevent any unintended forward movement of the vehicle while unloading the torque locked reverse solenoid 14b.

Figure 8B:
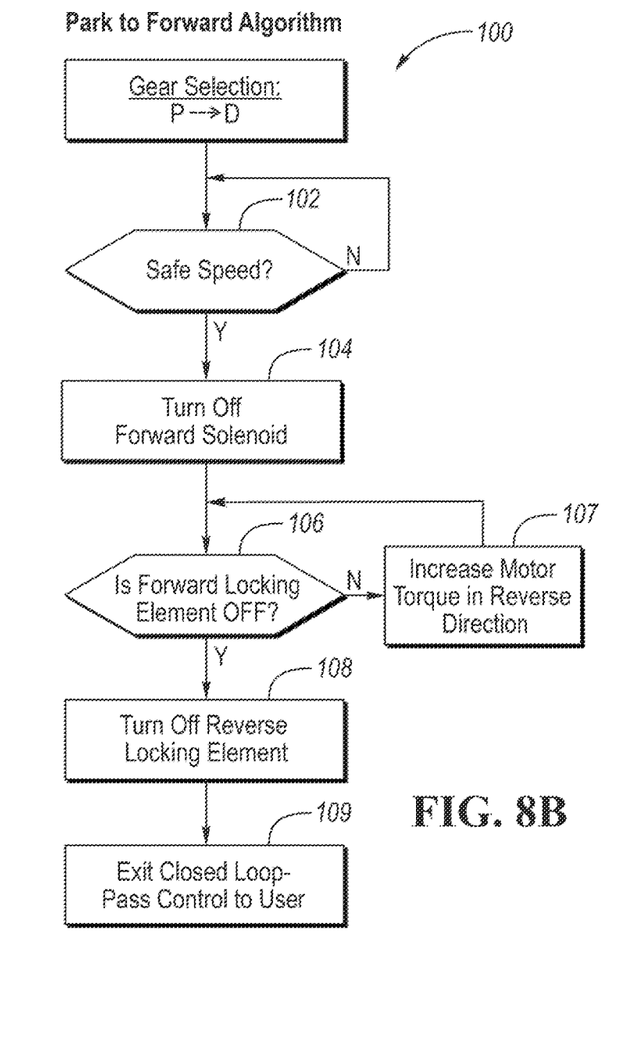
FIG. 8B illustrates a flowchart depicting representative operations of controlling the controllable coupling assembly for a "park-to-forward" control process using information from the position and speed sensors in accordance with an embodiment.

Referring now to FIG. 8B, a flowchart depicting representative operations of controlling controllable coupling assembly 12 for a "park-to-forward" control process using information from position sensors 44a, 44b and speed sensor 46 is shown. Initially, as represented by decision block 102, the parking engagement control process described with reference to FIG. 6 is conducted to put the vehicle into Park. In Park, both solenoids 14a, 14b are turned ON. The control process for moving the vehicle out of Park and into Forward then initiates with main controller 52 turning OFF forward solenoid 14a, as indicated in block 94. Main controller 52 uses position sensor 44a to determine whether forward solenoid 14a has been turned OFF or is stuck ON, as indicated in decision block 106. While forward solenoid 14a is stuck ON, main controller 52 causes the electric motor to ramp reverse torque, as indicated in block 107. Eventually enough reverse torque will be applied to release forward solenoid 14a. Thereupon, main controller 52 will turn OFF reverse solenoid 14b, as indicated in block 108, and motor control will be passed back to the vehicle driver, as indicated in block 109. At this point, the vehicle is out of Park and is in Forward. As described, while ramping the electric motor in the reverse direction, reverse solenoid 14b being left ON will prevent any unintended reverse movement of the vehicle while unloading the torque locked forward solenoid 14a.

As described, coupling and control assembly 10 may have the features of helping eliminate hydraulic control of clutches, having a decreased packaging space with the radial geometry, helping eliminate current park systems, high NVH while disengaging current park system while adding hill-hold function.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling and control assembly comprising:
a controllable coupling assembly including a first coupling member and a second coupling member supported for rotation relative to the first coupling member about an axis, the first coupling member having a first coupling face oriented to face radially with respect to the axis and having a speed sensor, the second coupling member having a second coupling face oriented to face radially with respect to the axis and having locking formations, the coupling members being positioned relative to each other so that the speed sensor is in a close-spaced opposition to the locking formations;
a first electromechanical component configured to move a first locking element between (i) a coupling position in which the first locking element engages one of the locking formations to thereby prevent rotation of the second coupling member in a first direction about the axis and (ii) a non-coupling position in which the first locking element is disengaged from the locking formations;
a second electromechanical component configured to move a second locking element between (i) a coupling position in which the second locking element engages one of the locking formations to thereby prevent rotation of the second coupling member in a second direction opposite to the first direction about the axis and (ii) a non-coupling position in which the second locking element is disengaged from the locking formations;

wherein the speed sensor is configured to sense the locking formations rotate past the sensor as the second coupling member rotates relative to the first coupling member about the axis to generate a speed signal indicative of a speed of rotation of the second coupling member; and a controller operative to receive the speed signal from the speed sensor and configured to control one of the electromechanical components to move the locking element corresponding to the one of the electromechanical components from the non-coupling position to the coupling position and control the other one of the electromechanical components to maintain the locking element corresponding to the other one of the electromechanical components in the non-coupling position upon the speed of rotation of the second coupling member decreasing to be lower than a hill-hold speed threshold.

2. The coupling and control assembly of claim 1 wherein: the controller is further configured to control the one of the electromechanical components to move the locking element corresponding to the one of the electromechanical components from the coupling position back to the non-coupling position upon the speed of rotation of the second coupling member subsequently increasing to be greater than the hill-hold speed threshold.

3. The coupling and control assembly of claim 1 wherein: the controller is further configured to control the first electromechanical component to move the first locking element from the non-coupling position to the coupling position and control the second electromechanical component to maintain the second locking element in the non-coupling position upon the speed of rotation of the second coupling member in the second direction decreasing to be lower than the hill-hold speed threshold to thereby prevent inadvertent rotation of the second coupling member in the first direction.

4. The coupling and control assembly of claim 3 wherein: the controller is further configured to control the first electromechanical component to move the first locking element from the coupling position back to the non-coupling position upon the speed of rotation of the second coupling member in the second direction subsequently increasing to be greater than the hill-hold speed threshold.

5. The coupling and control assembly of claim 1 wherein: the controller is further configured to control the second electromechanical component to move the second locking element from the non-coupling position to the coupling position and control the first electromechanical component to maintain the first locking element in the non-coupling position upon the speed of rotation of the first coupling member in the first direction decreasing to be lower than the hill-hold speed threshold to thereby prevent inadvertent rotation of the first coupling member in the second direction.

6. The coupling and control assembly of claim 5 wherein: the controller is further configured to control the second electromechanical component to move the second locking element from the coupling position back to the non-coupling position upon the speed of rotation of the first coupling member in the first direction subsequently increasing to be greater than the hill-hold speed threshold.

7. The coupling and control assembly of claim 1 wherein:

the controller is further configured to, in response receiving a Park command, control the electromechanical components to move the locking elements from the non-coupling position to the coupling position while the speed of rotation of the second coupling member is less than a park speed threshold; and the controller is further configured to, irrespective of receiving the Park command, control the electromechanical components to maintain the locking elements in the non-coupling position while the speed of rotation of the second coupling member is greater than the park speed threshold.

8. The coupling and control assembly of claim 7 wherein:

the controller includes a main controller, a first solenoid controller associated with the first electromechanical component, and a second solenoid controller associated with the second electromechanical component;

wherein the main controller is configured to, in response to receiving the Park command, provide a control signal to the solenoid controllers commanding the solenoid controllers to move the locking elements from the non-coupling position to the coupling position;

the solenoid controllers are configured to, in response to the control signal, control the electromechanical components to move the locking elements from the non-coupling position to the coupling position while the speed of rotation of the second coupling member is less than the park speed threshold; and the solenoid controllers are further configured to, in response to the control signal, ignore the control signal and maintain the locking elements in the non-coupling position while the speed of rotation of the second coupling member is greater than the park speed threshold.

9. The coupling and control assembly of claim 7 wherein:

the first coupling member further having a position sensor configured to generate a position signal indicative of whether the second locking element is in the coupling or non-coupling position; and the controller is operative to receive the position signal and is further configured to, in response to receiving a Reverse command after the locking elements have been moved to the coupling position in response to the Park command, control the second electromechanical component to move the second locking element to the non-coupling position, control the first electromechanical component to maintain the first locking element in the coupling position, diagnose from the position signal that the second electromechanical component is stuck in the coupling position, command a torque increase from an electric motor based upon a condition to remove torque from the second locking element so that the second locking element is allowed to move to the non-coupling position, and control the first electromechanical component to move the first locking element to the non-coupling position after the second locking element is allowed to move to the non-coupling position as confirmed from the position signal.

10. The coupling and control assembly of claim 7 wherein:
the first coupling member further having a position sensor configured to generate a position signal indicative of whether the first locking element is in the coupling or non-coupling position; and
the controller is operative to receive the position signal and is further configured to, in response to receiving a Drive command after the locking elements have been moved to the coupling position in response to the Park command, control the first electromechanical component to move the first locking element to the non-coupling position, control the second electromechanical component to maintain the second locking element in the coupling position, diagnose from the position signal that the first electromechanical component is stuck in the coupling position, command a torque increase from an electric motor based upon a condition to remove torque from the first locking element so that the first locking element is allowed to move to the non-coupling position, and control the second electromechanical component to move the second locking element to the non-coupling position after the first locking element is allowed to move to the non-coupling position as confirmed from the position signal.

11. A coupling and control assembly comprising:
a controllable coupling assembly including a first coupling member and a second coupling member supported for rotation relative to the first coupling member about an axis, the first coupling member having a first coupling face oriented to face radially with respect to the axis and having a speed sensor, the second coupling member having a second coupling face oriented to face radially with respect to the axis and having locking formations, the coupling members being positioned relative to each other so that the speed sensor is in a close-spaced opposition to the locking formations;
a first electromechanical component configured to move a first locking element between (i) a coupling position in which the first locking element engages one of the locking formations to thereby prevent rotation of the second coupling member in a first direction about the axis and (ii) a non-coupling position in which the first locking element is disengaged from the locking formations;
a second electromechanical component configured to move a second locking element between (i) a coupling position in which the second locking element engages one of the locking formations to thereby prevent rotation of the second coupling member in a second direction opposite to the first direction about the axis and (ii) a non-coupling position in which the second locking element is disengaged from the locking formations;
wherein the speed sensor is configured to sense the locking formations rotate past the sensor as the second coupling member rotates relative to the first coupling member about the axis to generate a speed signal indicative of a speed of rotation of the second coupling member; and
a controller operative to receive the speed signal from the speed sensor, the controller is configured to, in response to receiving a Park command, control the electromechanical components to move the locking elements from the non-coupling position to the coupling position while the speed of rotation of the second coupling member is less than a park speed threshold, and the controller is further configured to, irrespective of receiving the Park command, control the electromechanical components to maintain the locking elements in the non-coupling position while the speed of rotation of the second coupling member is greater than the park speed threshold.

12. The coupling and control assembly of claim 11 wherein:
the controller includes a main controller, a first solenoid controller associated with the first electromechanical component, and a second solenoid controller associated with the second electromechanical component;
wherein the main controller is configured to, in response to receiving the Park command, provide a control signal to the solenoid controllers commanding the solenoid controllers to move the locking elements from the non-coupling position to the coupling position;
the solenoid controllers are configured to, in response to the control signal, control the electromechanical components to move the locking elements from the non-coupling position to the coupling position while the speed of rotation of the second coupling member is less than the park speed threshold; and
the solenoid controllers are further configured to, in response to the control signal, ignore the control signal and maintain the locking elements in the non-coupling position while the speed of rotation of the second coupling member is greater than the park speed threshold.

13. The coupling and control assembly of claim 11 wherein:
the controller is further configured to control one of the electromechanical components to move the locking element corresponding to the one of the electromechanical components from the non-coupling position to the coupling position and control the other one of the electromechanical components to maintain the locking element corresponding to the other one of the electromechanical components in the non-coupling position upon the speed of rotation of the second coupling member decreasing to be lower than a hill-hold speed threshold.

14. The coupling and control assembly of claim 13 wherein:
the controller is further configured to control the one of the electromechanical components to move the locking element corresponding to the one of the electromechanical components from the coupling position back to the non-coupling position upon the speed of rotation of the second coupling member subsequently increasing to be greater than the hill-hold speed threshold.

15. The coupling and control assembly of claim 11 wherein:
the first coupling member further having a position sensor configured to generate a position signal indicative of whether the second locking element is in the coupling or non-coupling position; and
the controller is operative to receive the position signal and is further configured to, in response to receiving a Reverse command after the locking elements have been moved to the coupling position in response to the Park command, control the second electromechanical component to move the second locking element to the non-coupling position, control the first electromechanical component to maintain the first locking element in the coupling position, diagnose from the position signal that the second electromechanical component is stuck in the coupling position, command a torque increase from an electric motor based upon a condition to remove torque from the second locking element so that the second locking element is allowed to move to the non-coupling position, and control the first electromechanical component to move the first locking element to the non-coupling position after the second locking element is allowed to move to the non-coupling position as confirmed from the position signal.

16. The coupling and control assembly of claim 15 wherein:
the first coupling member further having a position sensor configured to generate a position signal indicative of whether the first locking element is in the coupling or non-coupling position; and
the controller is operative to receive the position signal and is further configured to, in response to receiving a Drive command after the locking elements have been moved to the coupling position in response to the Park command, control the first electromechanical component to move the first locking element to the non-coupling position, control the second electromechanical component to maintain the second locking element in the coupling position, diagnose from the position signal that the first electromechanical component is stuck in the coupling position, command a torque increase from an electric motor based upon a condition to remove torque from the first locking element so that the first locking element is allowed to move to the non-coupling position, and control the second electromechanical component to move the second locking element to the non-coupling position after the first locking element is allowed to move to the non-coupling position as confirmed from the position signal.

17. A method for use with a coupling and control assembly having (a) a controllable coupling assembly including a first coupling member and a second coupling member supported for rotation relative to the first coupling member about an axis, the first coupling member having a first coupling face oriented to face radially with respect to the axis and having a speed sensor, the second coupling member having a second coupling face oriented to face radially with respect to the axis and having locking formations, the coupling members being positioned relative to each other so that the speed sensor is in a close-spaced opposition to the locking formations, (b) a first electromechanical component configured to move a first locking element between (i) a coupling position in which the first locking element engages one of the locking formations to thereby prevent rotation of the second coupling member in a first direction about the axis and (ii) a non-coupling position in which the first locking element is disengaged from the locking formations, and (c) a second electromechanical component configured to move a second locking element between (i) a coupling position in which the second locking element engages one of the locking formations to thereby prevent rotation of the second coupling member in a second direction opposite to the first direction about the axis and (ii) a non-coupling position in which the second locking element is disengaged from the locking formations, the method comprising:
sensing, using the speed sensor, the locking formations rotating past the sensor as the second coupling member rotates relative to the first coupling member about the axis and generating, by the speed sensor, a speed signal indicative of a speed of rotation of the second coupling member;
receiving, by a controller, the speed signal from the speed sensor; and controlling, by the controller, one of the electromechanical components to move the locking element corresponding to the one of the electromechanical components from the non-coupling position to the coupling position and controlling, by the controller, the other one of the electromechanical components to maintain the locking element corresponding to the other one of the electromechanical components in the non-coupling position upon the speed of rotation of the second coupling member decreasing to be lower than a hill-hold speed threshold.

18. The method of claim 17 further comprising:
controlling, by the controller, the one of the electromechanical components to move the locking element corresponding to the one of the electromechanical components from the coupling position back to the non-coupling position upon the speed of rotation of the second coupling member subsequently increasing to be greater than the hill-hold speed threshold.

19. The method of claim 17 further comprising:
controlling, by the controller, in response receiving a Park command, the electromechanical components to move the locking elements from the non-coupling position to the coupling position while the speed of rotation of the second coupling member is less than a park speed threshold; and
controlling, by the controller, irrespective of receiving the Park command, the electromechanical components to maintain the locking elements in the non-coupling position while the speed of rotation of the second coupling member is greater than the park speed threshold.

20. The method of claim 17, wherein the first coupling member further has first and second position sensors configured to respectively generate first and second position signals indicative of whether the first and second locking elements are in the coupling or non-coupling position, the method comprising:
receiving, by the controller, the position signals from the position sensors;
in response to receiving a Reverse command after the locking elements have been moved to the coupling position in response to the Park command, the controller controlling the second electromechanical component to move the second locking element to the non-coupling position, controlling the first electromechanical component to maintain the first locking element in the coupling position, diagnosing from the second position signal that the second electromechanical component is stuck in the coupling position, commanding a torque increase from an electric motor based upon a condition to remove torque from the second locking element so that the second locking element is allowed to move to the non-coupling position, and controlling the first electromechanical component to move the first locking element to the non-coupling position after the second locking element is allowed to move to the non-coupling position as confirmed from the second position signal; and
in response to receiving a Drive command after the locking elements have been moved to the coupling position in response to the Park command, the controller controlling the first electromechanical component to move the first locking element to the non-coupling position, controlling the second electromechanical component to maintain the second locking element in the coupling position, diagnosing from the first position signal that the first electromechanical component is stuck in the coupling position, commanding a torque increase from an electric motor based upon a condition to remove torque from the first locking element so that the first locking element is allowed to move to the non-coupling position, and controlling the second electromechanical component to move the second locking element to the non-coupling position after the first locking element is allowed to move to the non-coupling position as confirmed from the first position signal.

* * * * *